United States Patent
Bradish

(10) Patent No.: US 9,756,608 B1
(45) Date of Patent: Sep. 5, 2017

(54) SYSTEMS AND METHODS FOR PROVIDING WIRELESS UNCONNECTED COMMUNICATION BETWEEN DEVICES

(71) Applicant: WIRELESS REGISTRY, INC., Washington, DC (US)

(72) Inventor: Stillman Bradish, Washington, DC (US)

(73) Assignee: The Wireless Registry, Inc., Washington, DC (US)

(*) Notice: Subject to any disclaimer, the term of this patent is extended or adjusted under 35 U.S.C. 154(b) by 0 days.

(21) Appl. No.: 14/603,976

(22) Filed: Jan. 23, 2015

Related U.S. Application Data

(60) Provisional application No. 61/938,832, filed on Feb. 12, 2014, provisional application No. 61/931,868, filed on Jan. 27, 2014.

(51) Int. Cl.
  *H04W 84/12* (2009.01)
  *H04W 72/00* (2009.01)
  *H04W 4/06* (2009.01)

(52) U.S. Cl.
  CPC .......... *H04W 72/005* (2013.01); *H04W 4/06* (2013.01)

(58) Field of Classification Search
  CPC ..... H04W 84/12; H04W 80/00; H04W 80/04; H04W 84/18
  See application file for complete search history.

(56) References Cited

U.S. PATENT DOCUMENTS

| | | | | |
|---|---|---|---|---|
| 6,456,599 B1* | 9/2002 | Elliott | ............... | H04W 40/26 370/254 |
| 7,808,960 B1* | 10/2010 | Chan | ............... | H04L 47/125 370/310 |
| 2007/0258508 A1* | 11/2007 | Werb | ............... | H04W 84/18 375/140 |
| 2012/0294234 A1* | 11/2012 | Bradish | ............... | H04W 4/04 370/328 |
| 2013/0130686 A1* | 5/2013 | Ikeda | ............... | H04W 48/16 455/435.1 |
| 2014/0003399 A1* | 1/2014 | Liu | ............... | H04W 4/08 370/336 |
| 2014/0146704 A1* | 5/2014 | Cho | ............... | H04L 45/46 370/254 |
| 2014/0254471 A1* | 9/2014 | Fang | ............... | H04W 84/047 370/315 |

* cited by examiner

*Primary Examiner* — Andrew Lee
(74) *Attorney, Agent, or Firm* — Eric L. Sophir; Dentons US LLP

(57) ABSTRACT

The present disclosure describes exemplary embodiments of systems and methods for enabling and managing unconnected communication between Wireless Enabled Devices (WEDs). One or more exemplary embodiments may include the utilization of Network Information Strings or other wireless identifiers to transmit information or content between WEDs where the information or content included in the unconnected communication may not be related to the operation of a wireless network.

20 Claims, 5 Drawing Sheets

SYSTEMS AND METHODS FOR PROVIDING WIRELESS UNCONNECTED COMMUNICATION BETWEEN DEVICES

CROSS-REFERENCE TO RELATED APPLICATIONS

This non-provisional patent application claims priority to U.S. Provisional Patent Application No. 61/931,868, entitled "Systems and Methods for Providing Wireless Unconnected Communication Between Devices," filed Jan. 27, 2014, and U.S. Provisional Patent Application No. 61/938,832, entitled "Systems and Methods for Providing Wireless Unconnected Communication Between Devices," filed Feb. 12, 2014, each of which are incorporated herein in their entireties.

TECHNICAL FIELD

The present disclosure relates in general to unconnected wireless communication, and more specifically to direct unconnected communication between wireless devices.

BACKGROUND

Wireless enabled devices (WEDs) when connected to a wireless network typically communicate using a protocol that defines message structures (sometimes referred to herein as "frames"). A message frame may include a field for a network identifier or name, the media access controller address (MAC) of the station from which the frame is broadcast, and other information. In order to connect to a network, a wireless station must first find a compatible network that is within range of its transceiver. This process is typically accomplished through either passive or active scanning. In passive scanning, an Access Point (AP) broadcasts its network name and other information in a message frame and other devices in the area may detect that signal. In active scanning, the wireless station requests a response from an access point by broadcasting the network ID of the network it is seeking to join. Alternatively, an active scanning process may include broadcasting a request for a response from any network within range of the wireless station. The APs that are within range broadcast their SSIDs to the wireless station. The wireless station may select a wireless AP to associate with from the list of responders.

Another architecture allows wireless stations to announce their presence to other wireless stations and to form networks in which there is no AP. In this case, the wireless station seeking other wireless stations broadcasts its network identifier and receives a response from other wireless stations within range.

Once a compatible network is found, the wireless station establishes a connection to a wireless network through an exchange of messages that authenticates the wireless station to an access point (or a wireless station when there is no AP present) and then associates the wireless station with that access point or wireless station. By way of illustration and not by way of limitation, an IEEE 802.11 network (or more commonly, "Wi-Fi" network) provides communications between a Wi-Fi AP and Wi-Fi enabled device. The Wi-Fi AP transmits the network name in the form of a service set identifier (SSID). The SSID is typically a 1 to 32 byte value that identifies an AP. If two wireless networks are physically close, the SSIDs label the respective networks, and allow the components of one network to ignore those of the other. The SSID is present in beacon messages sent by an AP, and may be present in other transmissions such as a probe request sent by a wireless station, probe responses sent by an AP, an association request sent by a probe request sent by a wireless station, and a re-association request sent by a wireless station. When wireless stations are operated without an access device (IBSS or ad-hoc mode), probe requests from one wireless station may be answered by another wireless station with a probe response.

A beacon message sent by an AP typically includes the SSID, the time, capabilities, supported data rates, and physical layer parameter sets that regulate the smooth operation of a wireless network.

The number of wireless enabled devices we could interact with on a daily basis is constantly increasing and there are many obstacles and limitations that the increasing number of wireless networks and wireless connections have. There is a need for simplified forms of wireless communication between devices.

SUMMARY

The present disclosure describes exemplary embodiments of systems and methods for enabling and managing unconnected communication between Wireless Enabled Devices (WEDs). One or more exemplary embodiments may include the utilization of Network Information Strings or other wirelessly transmitted identifiers to transmit information or content between WEDs where the information or content included in the unconnected communication may not be related to the operation of a wireless network.

In one embodiment, a computer-implemented method comprises continuously broadcasting, by a wireless device, one or more network information strings according to a wireless communication protocol, wherein the one or more network information strings are broadcasted at a predetermined interval in accordance with the wireless protocol; generating, by the wireless device, a network information string containing a message inputted into a user interface presented by the wireless device, wherein the wireless device broadcasts the network information string containing the message according to the wireless protocol in response to generating the network information string; receiving, by the wireless device, an incoming network information string from a second wireless device; and responsive to wireless device recognizing that the incoming information string contains an incoming message: extracting, by the wireless device, the incoming message from the incoming information string; executing, by the wireless device, one or more predetermined actions responsive to extracting the incoming message from the network information string; and forwarding, by the wireless device, the incoming information string to one or more next wireless device in response to extracting the incoming message.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
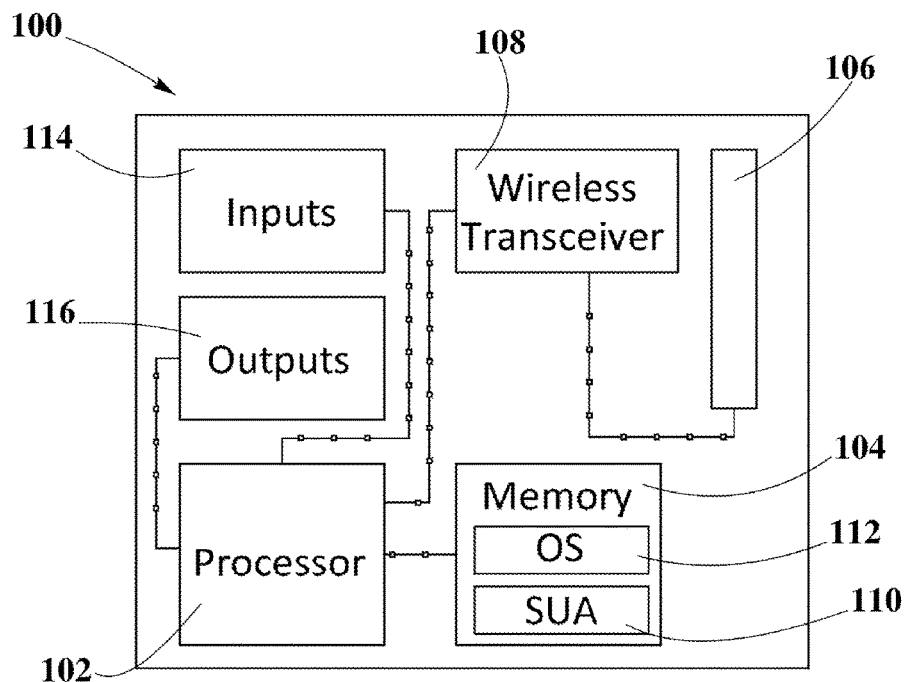
FIG. 1 shows a block diagram of the components of a wireless enabled device (WED), according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

As used here, the following terms may have the following definitions:

"Wireless Enabled Device," or "WED" refers to any electronic device capable to communicate using one or more suitable wireless technologies.

"Unconnected WED" refers to a WED without a suitable connection to an information string server and API.

"Beacon Message" refers a signal transmitted or received by an unconnected WED or connected WED, where this signal may contain a network information string.

"Network Information String" refers to a character string that may be included in a beacon message or probe message broadcast by a connected or unconnected WED. A network information string may include all or a portion of a service set identifier (SSID) of a Wi-Fi network, the MAC address or other wireless identifier or identifier broadcast by a WED, authentication codes embedded in the SSID, or the MAC address in combination with all or part of the network identifier.

Although the embodiments described herein make reference to Wi-Fi (802.11) communication protocols and information exchanges, it should be appreciated that in other embodiments any wireless communication technology (i.e., hardware, software, and protocols) may be implemented. Suitable WED hardware may be able to use a wireless signal or technology of any type, such as Bluetooth®, Bluetooth® Low Energy (BLE), Wi-Fi, WiMax, SuperWiFi, LTE systems, LTE Direct, Wi-Fi Direct, 3G, 4G, or any other wireless signal or technology. Wireless technologies involved in the embodiments described herein may be any technology that may wirelessly transmit name strings and wirelessly transmit wireless identifiers (IDs) of any kind (e.g., IP addresses, Universal Unique Identifiers (UUID), LTE Direct Expressions and LTE Hardware IDs, SSIDs and MAC addresses). A person having ordinary skill in the art would appreciate that the terms SSID and MAC, as used with the exemplary embodiments herein, are merely examples of possible wireless identifiers, and that wireless identifiers may be understood as including other wireless technologies (e.g., Bluetooth® names, LTE-Direct Expressions, etc.).

The WEDs described in the exemplary embodiments may utilize String Utilization Applications to encode messages in network information strings. The messages may be encoded and parsed to be sent in parts through network information strings.

According to some embodiments, the WEDs receiving a message through network information strings may also utilize String utilization Applications to decode the received message and take a suitable action.

According to an exemplary embodiment, String utilization Applications may allow different devices to use suitable encoding methods which may facilitate the unconnected communication between devices.

In one embodiment, one WED may request an unconnected communication protocol to a suitable server in order to be able to communicate with another WED.

In one exemplary embodiment, the systems and methods described in the exemplary embodiments of the present disclosure may allow a WED to send direct commands to another WED using unconnected communication.

In another exemplary embodiment, the systems and methods described in the exemplary embodiments of the present disclosure may allow a WED to interact directly with one or more WEDs using unconnected communication.

The present disclosure describes exemplary embodiments of systems and methods for enabling and managing unconnected communication between Wireless Enabled Devices (WEDs). One or more exemplary embodiments may include the utilization of Network Information Strings to transmit information or content between WEDs where the information or content included in the unconnected communication may not be related to the operation of a wireless network.

FIG. 1 illustrates a block diagram of components that a WED 100 may include, according to an exemplary embodiment. WEDs 100 may include a processor 102 coupled to an internal memory 104 and may optionally have one or more antennas 106 for sending and receiving electromagnetic radiation. Each Antenna 106 may be connected to a transceiver 108, which may be coupled to the processor 102. The wireless transceiver 108 may provide wireless communications via a wireless antenna 106. According to some exemplary embodiments, wireless communications may include Wi-Fi communications, RFID communications, Zigbee communications, Bluetooth communications, 3G/4G communications and LTE direct communications. Wireless transceiver 108 may be compliant with known in the art networking protocol standards, such as, by way of illustration and not by way of limitation, IEEE 802.11x standards.

Processor 102 may be any programmable microprocessor, microcomputer or multiple processor chip or chips that may be configured by software instructions (applications) to perform a variety of functions, including the functions described in the various exemplary embodiments of the present disclosure. According to some exemplary embodiments, WED 100 may include multiple processors 102, for example, one or more processors 102 dedicated to wireless and/or cellular communication functions and one processor 102 dedicated to running other applications.

According to exemplary embodiments, software applications may be stored in internal memory 104 before they are accessed and loaded into the processor 102. For example, the internal memory 104 may include a string utilization application 110. In an embodiment, the processor 102 may include or have access to an internal memory 104 capable of storing the application software instructions. Internal memory 104 may also include an operating system 112.

Additionally, internal memory 104 may be a volatile or nonvolatile memory, or a mixture of both. For the purposes of the exemplary embodiments of the present disclosure, in general memory may refer to any memory accessible by the processor 102, including internal memory 104, removable memory plugged into the computing device, and memory within the processor 102 itself, including the secure memory.

According to further exemplary embodiments, WED 100 may optionally include removable memory units. Additionally, in some implementations, transceiver 108 and portions of processor 102 and internal memory 104 may be used for multi-network communications. Optionally, WED 100 may also include a key pad or any known in the art suitable means 114 for receiving user inputs. Additionally, WED 100 may optionally include a display. In some exemplary embodiments display may be a touch-sensitive device that may be configured to receive user inputs. In an embodiment, additional memory chips may be plugged into WED 100 and operatively coupled to processor 102. WED 100 may also include suitable output means 116, such as speakers, LEDs and displays, among others.

Messaging Using Network Information Strings

Figure 2:
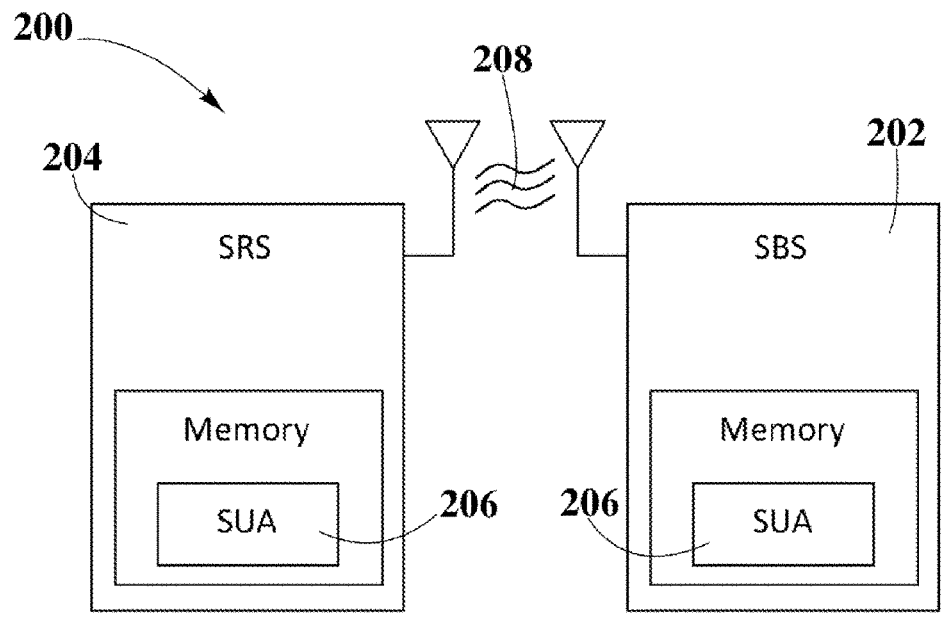
FIG. 2 is a flowchart of a process of acquisition of content, according to an exemplary embodiment.

FIG. 2 illustrates a messaging system 200, according to exemplary embodiments. Messaging system 200 may enable direct unconnected communication between WEDs. This may be achieved by conveying information in a network identifier or Network Information String that may be sent and received by WEDs, where the information may be unrelated to the operation of wireless networks.

In an exemplary embodiment, a WED may act as a String Broadcast Station, SBS 202, and one or more WEDs may operate as String Receiver Stations, SRSs 204. Each SBS 202 and SRS 204 may have an instance of a String Utilization Application 206 installed. Where String Utilization Applications 206 may be capable of providing instructions to the processing units of the WEDs to enable direct unconnected communication between them. According to some embodiments, String Utilization Application 206 may allow SRSs to interact with SBSs.

String Utilization Applications 206 may allow direct communication between different devices. According to exemplary embodiments, String Utilization Applications 206 may enable SBSs 202 to encode messages in Network Information Strings. In some exemplary embodiments, one message may be segmented and sent in parts over multiple consecutive Network Information String Broadcasts. According to some embodiments, may allow SRSs to recognize the network information strings encoded with a messages, it may be capable of extracting the messages and interpret them. Furthermore, String Utilization Applications 206 may enable WEDs to take actions in response to the messages received in network information strings.

According to one embodiment, a string utilization application 206 may receive an input from a user of SBS 202 and may generate a network information string that includes the input as a text message. By way of illustration and not by way of limitation, the input may include user settings, commands, requests, device details, a message log, contact details, links to websites, links to email addresses, links to phone numbers, advertisements, coupons, and offers among others. The generated network information string may then be broadcast by the SBS 202 in a beacon message 208 using String Utilization Applications 206.

One or more SRSs 204, also operating an instance of string utilization application 206, may be capable of receiving one or more generated network information string from an SBS 202. The instance of the string utilization application 206 operating on the SRS 204 may enable the SRS to recognize the network information string as encoded with a message and extract the message from the network information string. According to some embodiments, the SRS 204 may be capable of taking an action in response to the received message. Actions may include turning on or off a device, initiating a sequence, initiating communication, answering a request, broadcasting device information or displaying a message on a screen, among others.

In an embodiment, the string utilization application 206 operating on SRS 204 may further enable SRS 204 to operate as an SBS 202. In this embodiment, the instance of the string utilization application 206 operating on SRS 204 may be used to broadcast a message through a generated network information string to another WED acting as a SRS.

In a further embodiment, the string utilization application 206 operating on SRS 204 may enable SRS 204 to operate as an SBS 202. In this embodiment, the instance of the string utilization application 206 operating on SRS 204 may be used to rebroadcast or forward a message through a generated network information string to another WED acting as a SRS 204. Thus a second SRS 204, which may be out of range of the SBS 202, may still receive the generated network information string. The instance of the string utilization application 206 operating on the second SRS 204 may then extract the message from the forwarded network information string and the SRS 204 may take a suitable action in response to the received message.

As described above, the string utilization application 206 may enable the SBSs 202 to receive an input from a user and to generate a network information string that incorporates the received input as a message. The string utilization application 206 may also enable the SRSs 204 to determine if a network information string includes an encoded message and to parse the network information string to obtain the message.

In an embodiment, the network information string that is generated by the string utilization application 206 operating on the SBS 202 conforms to a structure that is recognized by an instance of the string utilization application 206 operating on a SRS 204. Any message structure may be adapted for use with a string utilization application 206. According to some embodiments, different devices may be designed to receive instructions or communicate in specific structures and string utilization applications 206 may be programmed to "translate" or facilitate the communication of two or more unconnected WEDs.

According to an embodiment, SRSs 204 may be configured to listen for beacon messages 208 transmitted by SBSs 202. In an embodiment, an SBS 202 beacon message 208 may include a network information string. A SRS 204 operating a string utilization application 206 may receive one or more beacon messages 208 and obtain the network information string from each received beacon message 208. The SRSs 204 may also receive a probe message from a WED not including a string utilization application 206. The probe message may include the media access controller (MAC) address of the WED. Thus, a SRS may receive probe and beacon messages from WEDs and SBSs that are within range of the SRS.

Figure 3:
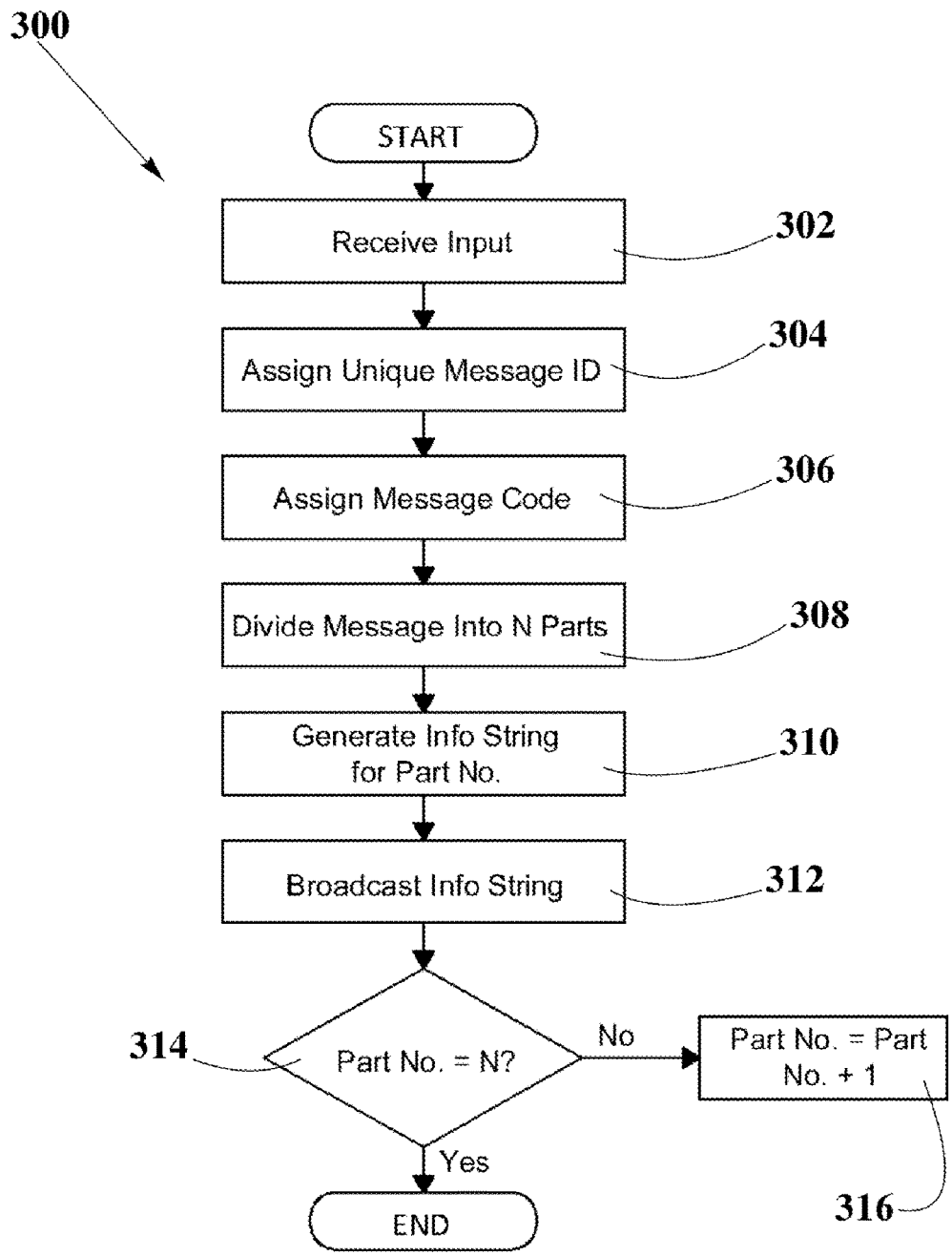
FIG. 3 shows a block diagram of a listener module, according to an exemplary embodiment.

FIG. 3 is a flow diagram illustrating a process 300 for conveying a message to a WED acting as an SRS, according to an exemplary embodiment.

The process may start when a WED operating as a SBS receives an input from a user, at step 302. The input may be handled by a string utilization application operating on the WED. According to an exemplary embodiment, a WED may be configured to constantly broadcast device information which may enable other WEDs to detect it and initiate unconnected communication if required. Then, the string utilization application may enable the WED to assign a unique message ID to the received input or automatically generated message, at step 304. A message code may then be assigned to the message at step 306.

Subsequently, the message may be divided into "N" parts or segments, at step 308. In an embodiment, a maximum number of message parts is established and/or a maximum number of characters may be specified, the maximum number of characters allowed to be included in one part or segment may vary according to the limitations of the different wireless technologies. In some exemplary embodiments, the maximum number of character per part may be about 144 characters.

Then, a network information string may be generated for each part number, starting with part 1, at step 310. The generated network information string may then be broadcasted by the WED in a beacon message, at step 312.

At step 314, a determination is made whether the last message part broadcasted by the WED was message part "N." If the last message part broadcasted by the WED was message part "N" the process may end. If the last message broadcasted by the WED is not message part "N", the part number may be incremented by "1", at step 316, and the process returns to step 310 where a network information string is generated for the next message part. The next message part is broadcast by the SBS in a beacon message, at step 312. The process again checks to determine whether the last message part broadcasted by the SBS was message part "N." at step 314 and the process continues until all "N" message parts have been sent.

According to some embodiments, the string utilization application operating on the WED may be configured to establish the number of times a message part is broadcast and the time between broadcasts.

In an embodiment, the string utilization application operating on the WED will continuously monitor all network information strings received by the WED to identify generated network information strings. By way of example and not of limitation, a generated network information string with the same message ID (for example, the first three bytes of the generated network information string) may be identified as part of a single message. The string utilization application may use message part codes to assemble the message parts in the proper order regardless of the order in which they are received. In an embodiment, a maximum number of message parts may be established and/or a maximum number of characters may be specified.

According to an embodiment, some instances of string utilization applications may only receive messages of the message types that match the message type settings in the application settings of the WED. In an embodiment, a user of the string utilization application may specify the types of messages that may be received by the string utilization application. In another embodiment, a provider of a WED may specify the types of messages that may be received by the string utilization applications. In another embodiment, authentication of the SBS may be required by the string utilization applications to receive a message.

In another embodiment, the string utilization application may be configured such that the WED will only receive or relay any one message ID once regardless of the relay number. This may prevent messages relaying back and forth between devices. The string utilization application operating on a receiving WED may be configured to establish the number of times a message part is re-broadcast and the time between re-broadcasts.

In an embodiment, the string utilization application may be configured to allow a WED to be instructed by a user to forward a message as new. If the message is sent as new, the same message and message ID may be used so that other WED operating the string utilization application that have already processed the message may continue to ignore it. However, the "new" message will be sent with a message relay number of 1 thereby allowing the message to be relayed up to the predetermined number of relays and displayed on wireless stations that have not processed the message.

In an embodiment, the string utilization application may be configured to allow the WED to automatically forward messages that have not exceeded the predetermined number of relays. This function is intended to enable a local area to spread messages among a broad range of devices beyond the signal range of a single SBS. The string utilization application may also be configured to turn off automatic forwarding.

In an embodiment, the message code may affect the behavior on the WED that receives a particular message.

The string utilization application may be configured to allow a WED to manage messages according to user preferences. For example, the WED may be configured to display a number of detected WEDs when they are detected or periodically. Detected WEDs may be grouped for display by codes or following a user established criteria. The string utilization application may be configured to allow a user of a WEDs to set other optional settings, including logs, preferred devices, links to websites, automatic broadcasts, and other features.

Figure 4:
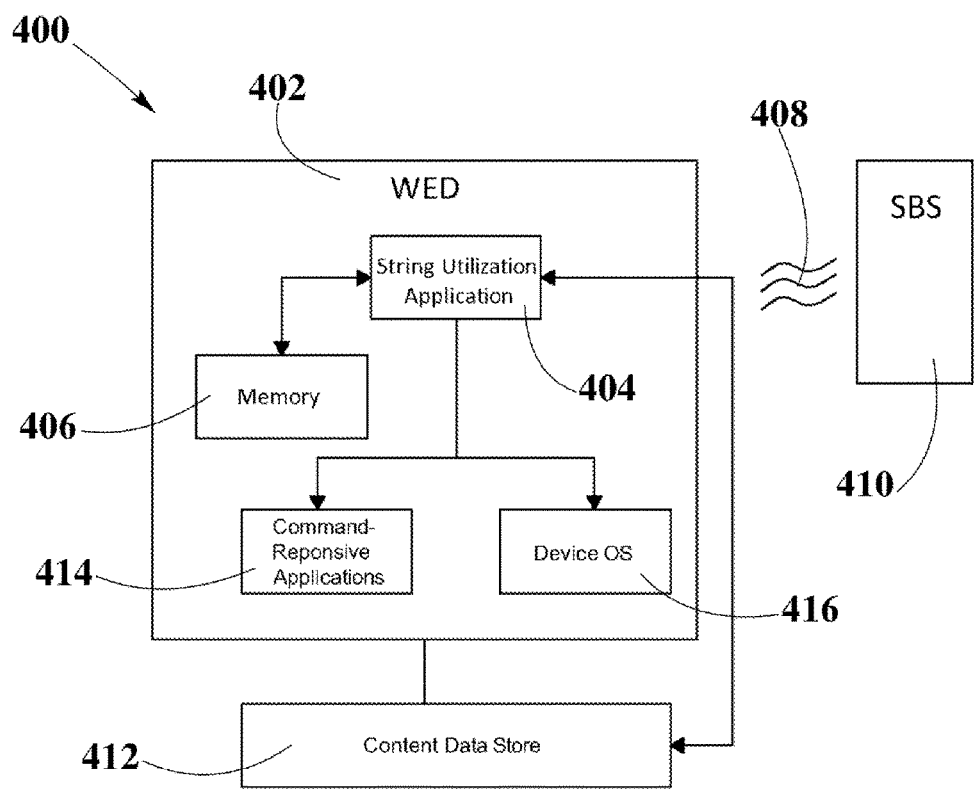
FIG. 4 shows the operation of a WED in response to receipt of a network information string, according to an exemplary embodiment.

FIG. 4 shows the operation 400 of a WED 402 in response to receipt of a network information string, according to an exemplary embodiment.

In an embodiment, a WED 402, such as, for example and without limitation a Wi-Fi enabled device, may be configured with a string utilization application 404 executable by a processing unit. By way of illustration and not by way of limitation, the WEDs may include a cell phones, smart phones, laptop computers, vending machines, cash registers, wireless enabled light bulbs, wireless enabled garage doors, wireless printers, wireless parking meters, wireless enabled toys, wireless enabled guns and military appliances and wireless enabled house appliances among others.

The memory 406 of the WED 402 may include a list of network information strings that are associated with command codes, which list is accessible to string utilization application 404. WED 402 may receive one or more beacon messages 408 from a SBS 410. The string utilization application 404 may examine the network identifier (for example and not as a limitation, an SSID) of each beacon message 408. In an embodiment, the string utilization application 404 may determine if the network identifier contains a network information string on the command code list stored in memory 406.

Alternatively, the string utilization application 404 may forward a received network information string to an information. The string server may respond with content that is stored in a content datastore 412 that may include command codes.

When the string utilization application 404 receives a listed network information string associated with a command code that is stored in memory 406 or content datastore 412, the string utilization application 404 refers the listed command code to a command-responsive application 414 or to the operating system 416 of the WED 402. The command-responsive application 414 and the operating system 416 may be configured to take an action in response to the receipt of the command code. For example, the command-responsive application 414 may be running on a light bulb designed to turn on upon receipt of a specific command code. In another example, another instance of a command-responsive application 414 may be running on a garage door and may be programmed to open the garage door upon receipt of the correct command-code from an authenticated device. In yet another example, the command-responsive application 414 may be a browser that is configured to open a particular web page in response to a particular command code. The device operating system 416 may be configured to load an instance of a command-responsive application 414 from a memory 406 or to download a command-responsive application from the Internet or any suitable sources. Other actions may include downloading a list of commands or related content from a registry, activating or automatically paying fees on parking meters, buy a products from vending machines, unlocking the trigger of weapons, opening the front door of a house, turning on vehicles, printing a document, turning on or off an air conditioner, dimming room lights when the home theater is turned on and activating toys, among others.

Figure 5:
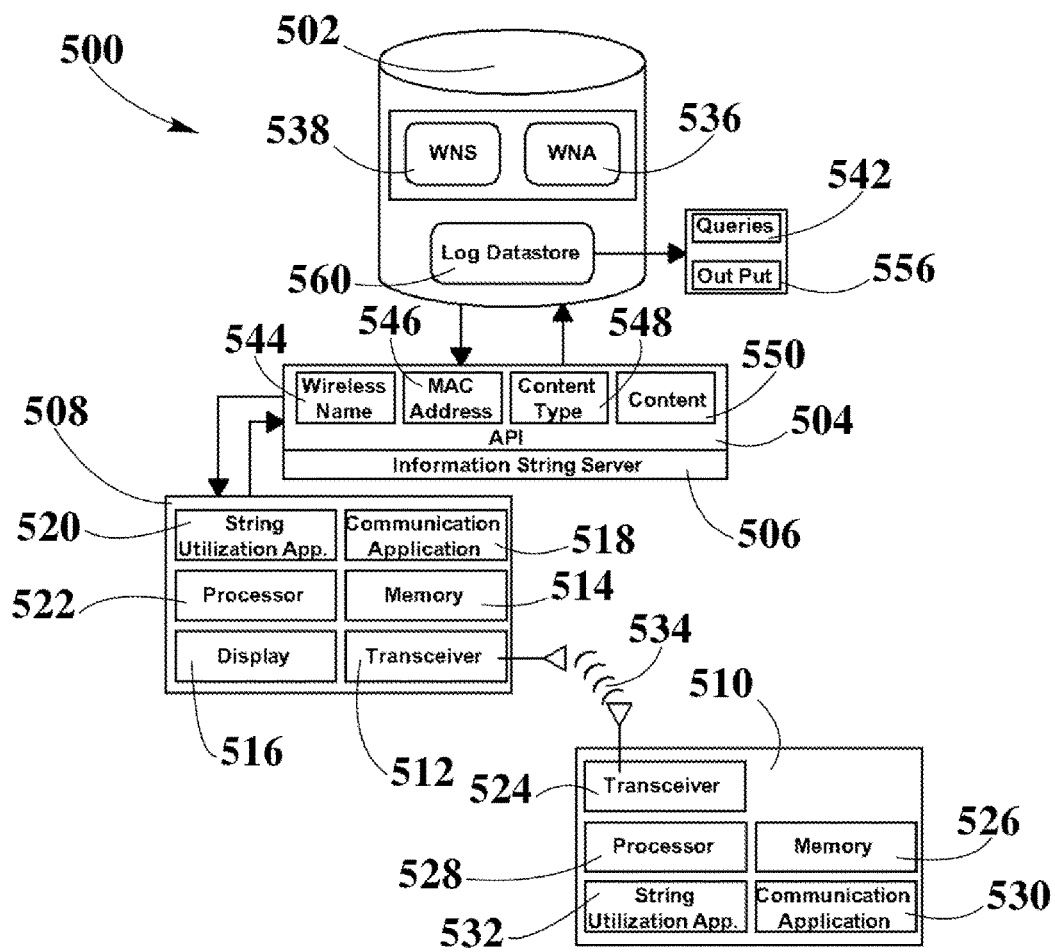
FIG. 5 is a block diagram of a wireless ID system illustrating acquisition of network information strings from WEDs, according to an embodiment.

FIG. 5 is a block diagram of a wireless ID system 500 illustrating the acquisition of one or more network information strings from one or more connected or unconnected WEDs for retrieving associated content, according to an embodiment.

System 500 may include a registry 502; an application programming interface API 504 operatively coupled with an information string server 506; a least one connected WED 508 operatively coupled with information string server 506 and API 504; and one or more unconnected WEDs 510 in unconnected communication with a connected WED 508.

Connected WED 508 may include a transceiver 512, a memory 514, a display 516, a communication application 518, a string utilization application 520, and a processor 522. By a way of illustration and not by way of limitation, connected WED 508 may include cell phones, smartphones, access points, tablet computers, desktop computers, banking terminals, cash register and the like. The communication application 518 may provide instructions to processor 522 to enable connected WED 508 to interact with one or more unconnected WEDs 510, or other connected WEDs 508. Connected WED 508 may have a constant or intermittent connection with information string server 506 and API 504.

Similarly, unconnected WED 510 may include a transceiver 524, a memory 526, a processor 528, a communication application 530, and a string utilization application 532. By a way of illustration and not by way of limitation, unconnected WED 510 may include home appliances, electronic toys, cloth or shoe apparel, vending machines, garage doors, front doors, printers, and weapons, among others. The communication application 530 may provide instructions to processor 528 to at least enable unconnected WED 510 to transmit a beacon message 534. Unconnected WED 510 may also include a display (not shown).

Beacon messages 534 may include a network information string that may be associated with content stored in registry 502. Specifically, the network information string may be associated with content stored in a wireless name associator WNA 536, while the network information string may be stored or registered in a wireless name system WNS 538. The network information string stored in WNS 538 may include all or a portion of a SSID of a Wi-Fi network, and/or the MAC address broadcast by unconnected WED 510 or another connected WED (not shown), and authentication codes embedded in the SSID. Content stored in WNA 536 may include command lists, codes, authentication codes and protocols, directions or links associated with the network information string stored in WNS 538. Both, WNA 536 and WNS 538, can be part of the ownership module of registry 502 which can be accessed or managed by a user of system 500.

Connected WED 508 may receive one or more beacon messages 534 broadcast from one or more unconnected WEDs 510 or another connected WED (not shown). String utilization application 520 in connected WED 508 may check for content stored in memory 514 that may be associated to the network information string in beacon message 534. If the content is not found in memory 514, connected WED may send a query 542 for content retrieval to information string server 506 via a wired or wireless link. Alternatively, connected WED 508 may send query 542 for content retrieval without first examining the network information string. Query 542 may include a request for authenticating or identifying unconnected WED 510 and/or for obtaining associated content.

According to an embodiment, information string server 506 may process one or more queries 542 through API 504. This API 504 may manage the operation of information string server 506 and its interaction with registry 502. API 504 may be implemented though suitable computing equipment running high-volume programming languages for processing numerous queries 542 at the same time. By a way of illustration and not by way of limitation, high-volume programming languages may include Erlang, go, and Cassandra, among others. Information string server 506 may be physically separate from registry 502 which may be located in another server operatively coupled with information string server 506. Alternatively, registry 502 may be integrated in information string server 506.

API 504 may include different modules for processing one or more queries 542 for content retrieval. For example, API 504 may process query 542 based on the wireless name 544 or SSID and MAC address 546 included in the network information string. In another embodiment, API 504 may process query 542 based on the content 550 and content type 548 that may be returned to connected WED 508. Yet in another embodiment, API 504 may include another module (not shown) for processing authentication codes embedded in SSIDs.

API 504 may perform a check of the SSID and/or MAC address included in the network information string transmitted through beacon message 534. Specifically, API 504 may check the SSID and MAC address included in the network information string against a list of SSIDs and MAC addresses stored in WNS 538. If the SSID and/or the MAC address in network information string are stored or were previously enrolled in WNS 538, then API 504 may check for content in WNA 536 associated with the SSID and/or MAC address transmitted by unconnected WED 510. API 504 may retrieve associated content from WNS 538 and may output 556 this content back to connected WED 508. The content returned to connected WED 508 may provide information such as lists of commands, codes, authentication protocols, links or other information related to unconnected WED 510 which transmitted beacon message 534. This content may identify what type of device broadcast the network information string in beacon message 534. For example, based on content received from API 504, connected WED 508 may determine that unconnected WED 510 is an electronic toy and may obtain further information about its characteristics, performance, cost, and/or location, among others. In another embodiment, API 504 may respond with content related to one or more unconnected WEDs 510, or one or more connected WEDs (not shown) in proximity to connected WED 508.

During this operation, information about queries 542 for content retrieval and content output 556 may be stored in the form of API logs in a log datastore 560. This log datastore 560 may be included in registry 502, but may not be part of the ownership module, meaning that the data logged in log datastore 560 may not be directly controlled by a user of system 500. API logs about queries 542 and content output 556 may include identifying information of one or more unconnected WEDs 510 or one or more connected WEDs 508; identifying information of the user of system 500 or connected WED 508; a list of MAC addresses and/or SSIDs embedded in detected network information strings; time and date when the query 542 or content output 556 was made; content and/or content type queried or returned; and the location of connected WED 508 and/or unconnected WED 510 when the query 542 for content retrieval was made.

In an embodiment, the API logs captured in log datastore 560 may allow the identification of patterns of action of one or more connected WEDs 508, or one or more unconnected WEDs 510, or their respective users. In another embodiment, API logs captured in log datastore 560 may identify user preferences, determine the response of user of connected WED 508 to the content associated with the network information string, and measure the interest of the user of connected WED 508 in types of content. Yet in another embodiment, API logs captured in log datastore 560 may allow the association of one or more connected WEDs 508 or one or more unconnected WEDs 510 to one or more patterns of action without requiring registration at the WNS 538.

By a way of illustration and not by way of limitation, patterns of action may include movement or behavior patterns of connected WEDs 508 or unconnected WEDs 510 based on location information registered in API logs for connected WEDs 508 or unconnected WEDs 510.

In example #1, wireless enabled light bulbs are controlled using a smartphone. In this example, both devices have an instance of a string utilization applications installed. The smartphone is able to detect the wireless enabled light bulbs and download a list of commands that the string utilization application installed on the light bulbs is able to receive. A user is able to send commands to the light bulbs through the smartphone, using unconnected communication systems and methods previously described.

In example #2, a wireless enabled garage door is operated using a smartphone. In this example, both devices have an instance of a string utilization applications installed. The smartphone is able to detect the garage door and the first time both devices interact an enrollment step may be needed. Afterwards, the garage door may be able to authenticate the messages coming from the enrolled device and may be able to take action only when the commands come from authenticated sources.

In example #3, a wireless enabled teddy bear is operated using a smartphone. In this example, both devices have an instance of a string utilization applications installed. The smartphone is able to detect the teddy bear. The teddy bears box includes a code, which is needed for the teddy bear to take commands from the smartphone. The code is introduced on the smartphone, and the teddy bear responds to the list of commands it is programmed to receive. Alternatively the smartphone can detect signals from the teddy bear and check the WNS to get the codes needed to interact with the teddy bear.

In example #4, wireless enabled TV is controlled using a smartphone. In this example, both devices have an instance of a string utilization applications installed. The smartphone is able to detect the wireless enabled TV and download from a registry a list of commands that the string utilization application installed on the TV is able to receive. A user is able to send commands to the TV through the smartphone, using unconnected communication systems and methods previously described.

In example #5, wireless enabled vending machine interacts with a smartphone. In this example, both devices have an instance of a string utilization applications installed. The smartphone is able to detect the wireless enabled vending machine and download from a registry a list of commands that the string utilization application installed on the vending machine is able to receive. Additionally, the smartphone is able to download a list of the products that can be purchased from that vending machine and the list of prices. A user may be able to select one or more products to purchase and may be able to pay using the smartphone and the smartphone may transmit wireless ID strings in the correct format which the vending machine will recognize and take action, such as dispense products.

While various aspects and embodiments have been disclosed, other aspects and embodiments are contemplated. The various aspects and embodiments disclosed are for purposes of illustration and are not intended to be limiting, with the true scope and spirit being indicated by the following claims.

The exemplary embodiments can include one or more computer programs that embody the functions described herein and illustrated in the appended diagrams. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "detecting" or "connecting" or "sending" or "determining" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that numerous alternative components and embodiments that may be substituted for the particular examples described herein and still fall within the scope of the invention.

What is claimed is:

1. A method comprising:
   receiving, by a first wireless device, input,
      the input containing information not related to the operation of a wireless network;
   generating, by the first wireless device, a network information string containing the input as a message;
   broadcasting, by the first wireless device, the network information string containing the message according to a wireless protocol;
   receiving, by a second wireless device, the network information string,
      the second wireless device being not authenticated and not associated with the first wireless device;
   extracting, by the second wireless device, the message from the network information string; and,
   executing, by the second wireless device, one or more predetermined actions based on the information in the message extracted from the network information string.

2. The method of claim 1, further comprising:
   forwarding the network information string to one or more next wireless devices.

3. The method of claim 1, where
   the first wireless device is at least a string broadcast station; and,
   the second wireless device is at least a string receiver station.

4. The method of claim 1, where
   the first and second wireless devices include a string utilization application.

5. The method of claim 1, further comprising:
   encoding, by the first wireless device, the message using a string utilization application; and
   decoding, by the second wireless device, the message using a string utilization application.

6. The method of claim 1, where
   the input includes at least one of user settings, commands, requests, device details, a message log, contact details, links to websites, links to email addresses, links to phone numbers, advertisements, coupons, and offers.

7. The method of claim 1, where
   the predetermined actions include at least one of turning on or off a device, initiating a sequence, initiating communication, answering a request, downloading a list, changing TV channels, responding to commands, broadcasting device information, delivering product, or displaying a message on a screen.

8. A non-transitory computer readable medium storing instructions, the instructions comprising:
   one or more instructions which, when executed by one or more processors, cause the one or more processors to:
   receive input,
      the input containing information not related to the operation of a wireless network;
   generate a network information string containing the input as a message;
   broadcast the network information string containing the message according to a wireless protocol;
   receive an incoming network information string from a wireless device that is not authenticated and associated,
   extract an incoming message from the incoming network information string,
      the incoming message containing incoming information not related to the operation of a wireless network; and,
   execute one or more predetermined actions based on the incoming information in the incoming message.

9. The non-transitory computer readable medium of claim 8, where the one or more instructions further cause the one or more processors to:
   forward the incoming network information string to one or more next wireless devices.

10. The non-transitory computer readable medium of claim 8, where the one or more instructions further cause the one or more processors to:
    encode the message using a string utilization application; and
    decode the incoming message using the string utilization application.

11. The non-transitory computer readable medium of claim 8, where the one or more instructions, that cause the one or more processors to receive input, cause the one or more processors to:
receive input including at least one of user settings, commands, requests, device details, a message log, contact details, links to websites, links to email addresses, links to phone numbers, advertisements, coupons, and offers.

12. The non-transitory computer readable medium of claim 8, where the one or more instructions, that cause the one or more processors to execute predetermined actions, cause the one or more processors to:
execute the predetermined actions include at least one of turning on or off a device, initiating a sequence, initiating communication, answering a request, downloading a list, changing TV channels, responding to commands, broadcasting device information, delivering product, or displaying a message on a screen.

13. The non-transitory computer readable medium of claim 8, where the one or more instructions, that cause the one or more processors to generate a network information string, cause the one or more processors to:
generate the network information string using a string utilization application.

14. A wireless communication system comprising:
a first wireless device including one or more processors to:
receive input,
the input containing information not related to the operation of a wireless network,
generate a network information string containing the input as a message, and
broadcast the network information string containing the message according to a wireless protocol; and
a second wireless device not authenticated and not associated with the first wireless device,
the second wireless device including one or more processors to:
receive the network information string from the unconnected first wireless device,
extract the message from the network information string, and,
execute one or more predetermined actions based on the information in the message.

15. The wireless communication system of claim 14, where
the second wireless device is one of a plurality of wireless devices unconnected to the first wireless device,
the plurality of wireless devices each including one or more processors to:
receive the network information string from the first wireless device,
extract the message from the network information string, and,
execute one or more predetermined actions based on the information in the message.

16. The wireless communication system of claim 14, where
the one or more processors of the second wireless device are further to:
forward the network information string to one or more next wireless device.

17. The wireless communication system of claim 14, where
the first wireless device is at least a string broadcast station; and,
the second wireless device is at least a string receiver station.

18. The wireless communication system of claim 14, where
the one or more processors of the first wireless device are to encode the message using a string utilization application; and
the one or more processors of the second wireless device are to decode the message using the string utilization application.

19. The wireless communication system of claim 14, where
the input includes at least one of user settings, commands, requests, device details, a message log, contact details, links to websites, links to email addresses, links to phone numbers, advertisements, coupons, and offers.

20. The wireless communication system of claim 14, where
the predetermined actions include at least one of turning on or off a device, initiating a sequence, initiating communication, answering a request, downloading a list, changing TV channels, responding to commands, broadcasting device information, delivering product, or displaying a message on a screen.

* * * * *